(12) United States Patent
Coppola et al.

(10) Patent No.: US 10,941,355 B2
(45) Date of Patent: *Mar. 9, 2021

(54) SUPERCRITICAL WATER SEPARATION PROCESS

(71) Applicant: Applied Research Associates, Inc., Albuquerque, NM (US)

(72) Inventors: Edward N. Coppola, Panama City, FL (US); Charles Red, Jr., Youngstown, FL (US); Sanjay Nana, Panama City, FL (US); Kenneth D. Pelt, Panama City, FL (US); Jocelyn Marie Wahlgren, Panama City, FL (US)

(73) Assignee: Applied Research Associates, Inc., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/565,952

(22) Filed: Sep. 10, 2019

(65) Prior Publication Data

US 2020/0002629 A1 Jan. 2, 2020

Related U.S. Application Data

(63) Continuation of application No. 15/644,143, filed on Jul. 7, 2017, now Pat. No. 10,450,518.
(Continued)

(51) Int. Cl.
*C10G 55/04* (2006.01)
*B01D 11/04* (2006.01)
(Continued)

(52) U.S. Cl.
CPC .......... *C10G 55/04* (2013.01); *B01D 11/0403* (2013.01); *B01J 3/008* (2013.01);
(Continued)

(58) Field of Classification Search
CPC ...... C10G 21/003; C10G 21/08; C10G 27/00; C10G 47/32; C10G 55/04;
(Continued)

(56) References Cited

U.S. PATENT DOCUMENTS 4,290,880 A 9/1981 Leonard
4,822,497 A 4/1989 Hong et al.
(Continued)

FOREIGN PATENT DOCUMENTS

JP 2002155286 A 5/2002
JP 2011504962 A 2/2011

OTHER PUBLICATIONS

Watanabe, et al., "Heavy Oil Upgrading in Supercritical Water: Basic Study", Research Center of Supercritical Fluid Technology, 2011, pp. 1-5.

*Primary Examiner* — Brian A McCaig
(74) *Attorney, Agent, or Firm* — The Webb Law Firm (57) ABSTRACT

A supercritical water separation process and system is disclosed for the removal of metals, minerals, particulate, asphaltenes, and resins from a contaminated organic material. The present invention takes advantage of the physical and chemical properties of supercritical water to effect the desired separation of contaminants from organic materials and permit scale-up. At a temperature and pressure above the critical point of water (374° C., 22.1 MPa), nonpolar organic compounds become miscible in supercritical water (SCW) and polar compounds and asphaltenes become immiscible. The process and system disclosed continuously separates immiscible contaminants and solids from the supercritical water and clean oil product solution. The present invention creates a density gradient that enables over 95% recovery of clean oil and over 99% reduction of contaminants such as
(Continued)

asphaltenes and particulate matter depending on the properties of the contaminated organic material.

6 Claims, 2 Drawing Sheets

Related U.S. Application Data (60) Provisional application No. 62/359,896, filed on Jul. 8, 2016.

(51) Int. Cl.
  *B01J 3/00* (2006.01)
  *C10G 21/00* (2006.01)
  *C10G 21/08* (2006.01)
  *C10G 27/00* (2006.01)
  *C10G 47/32* (2006.01)

(52) U.S. Cl.
  CPC ......... *C10G 21/003* (2013.01); *C10G 21/08* (2013.01); *C10G 27/00* (2013.01); *C10G 47/32* (2013.01); *C10G 2300/1074* (2013.01); *C10G 2300/202* (2013.01); *C10G 2300/206* (2013.01); *C10G 2300/304* (2013.01); *C10G 2300/4006* (2013.01); *C10G 2300/4012* (2013.01); *C10G 2300/805* (2013.01); *C10G 2400/04* (2013.01)

(58) Field of Classification Search
  CPC ........ C10G 2300/202; C10G 2300/206; C10G 2300/304; C10G 2300/1074; C10G 2300/4006; C10G 2300/4012; C10G 2300/805; C10G 2400/04; B01D 11/0403; B01J 3/008
  See application file for complete search history.

(56) References Cited

U.S. PATENT DOCUMENTS

| | | |
|---|---|---|
| 5,316,659 A | 5/1994 | Brons et al. |
| 5,326,456 A | 7/1994 | Brons et al. |
| 7,399,408 B2 | 7/2008 | Joussot-Dubien et al. |
| 9,670,426 B2 | 6/2017 | Roney |
| 2005/0006317 A1 | 1/2005 | Lee et al. |
| 2007/0217980 A1 | 9/2007 | Garcia-Ortiz et al. |
| 2008/0099374 A1 | 5/2008 | He et al. |
| 2009/0139715 A1 | 6/2009 | Choi |
| 2009/0166261 A1 | 7/2009 | Li et al. |
| 2011/0147266 A1 | 6/2011 | Choi |
| 2013/0206645 A1 | 8/2013 | Yarbro |
| 2013/0310613 A1 | 11/2013 | Kalnes |
| 2014/0109465 A1* | 4/2014 | Coppola .............. C10G 45/60 44/307 |
| 2014/0238905 A1 | 8/2014 | Dunn et al. |
| 2014/0251871 A1 | 9/2014 | Choi et al. |
| 2015/0203768 A1 | 7/2015 | Coppola et al. |
| 2016/0214028 A1 | 7/2016 | Coppola et al. |
| 2017/0107433 A1 | 4/2017 | Choi et al. |
| 2017/0166819 A1 | 6/2017 | Choi et al. |
| 2017/0166821 A1 | 6/2017 | Choi et al. |
| 2017/0166824 A1 | 6/2017 | Choi et al. |

* cited by examiner

SUPERCRITICAL WATER SEPARATION PROCESS

CROSS REFERENCE TO RELATED APPLICATIONS

This application is a continuation of U.S. application Ser. No. 15/644,143, filed Jul. 7, 2017, which claims priority to United States Provisional Application Ser. No. 62/359,896, filed Jul. 8, 2016, the disclosures of each of which are hereby incorporated by reference in their entirety.

FIELD OF THE INVENTION

The present invention is directed to a supercritical water (SCW) separation process and system for the rapid separation of inorganic and organic contaminants, such as salts, minerals, metals, asphaltenes, particulate matter, catalyst fines, and coke precursors from contaminated organic materials such as petroleum and renewable oils. The process and system is characterized by mixing of supercritical water and a contaminated organic stream, extraction of soluble organic constituents by SCW, and gravity separation of insoluble contaminants by establishing and maintaining a density gradient in the separation vessel.

BACKGROUND OF THE INVENTION

Petroleum refiners are continually seeking to improve refinery throughput and increase the yields of the highest value products, primarily distillate transportation fuels. This is typically accomplished by atmospheric distillation of the lighter components of petroleum crude to produce straight-run naphtha, jet, and diesel fuels that can be readily hydrotreated to remove sulfur, or undergo further catalytic processing to meet gasoline, jet, and diesel fuel specifications. However, typical petroleum crude oils may contain only 40 to 70% straight-run distillate hydrocarbons that boil below 650° F. The goal then is to upgrade the remaining 30 to 60% of atmospheric tower bottoms (ATB) into distillate fuels that boil below 650° F. Petroleum ATB contains metals, asphaltenes, and resins that must be removed before it is converted into lower-boiling compounds via catalytic hydrocracking or fluid catalytic cracking (FCC).

Vacuum distillation of ATB is typically employed to produce vacuum gas oil (VGO) distillate and vacuum tower bottoms (VTB) or residuum that contains most of the contaminants and exhibits an atmospheric equivalent distillation temperature greater than about 1000-1050° F. Vacuum distillation is performed in a manner that VGO produced is sufficiently reduced in asphaltenes, Conradson Carbon Residue (CCR), and metals to permit upgrading into transportation fuels via catalytic hydrocracking or FCC. However, only about 80% of refineries have vacuum distillation systems because they are expensive to build and operate.

The residuum or VTB produced by many refiners still contains valuable hydrocarbons that could be cracked into additional distillate fuels if asphaltene, CCR, and metal content were reduced to acceptable levels. Solvent deasphalting is a refinery process for extracting asphaltenes and resins from ATB, VTB, or other heavy petroleum fractions to produce deasphalted oil (DAO) that is typically hydrotreated before being fed to FCC or hydrocracking systems. One such commercial process is called Residuum Oil Supercritical Extraction or the ROSE process practiced by KBR, Inc. The process consists of contacting the feedstock with volatile solvents, such as propane, butane, or mixtures thereof, in a counter-current extractor at the temperature and pressure needed to precipitate the asphaltene and resin components that are not soluble in the solvent. The solvent deasphalting process requires a considerable amount of solvent, and solvent recovery is an energy-intensive process. The yield of DAO is typically only 40-60%. Higher yields can only be obtained by sacrificing DAO quality. Due to the paraffinic nature of the solvent, paraffins are selectively extracted and recovered in the DAO fraction.

The refining industry would benefit greatly from a process, such as the present invention, that will produce high yields (over 90%) of a clean VGO equivalent from intermediate refinery streams or crude petroleum oil. The clean VGO equivalent is a suitable feed stream for hydrocracking or fluid catalytic cracking due to reduced levels of asphaltene, CCR, and metals content.

SUMMARY OF THE INVENTION

The present invention includes a process for separating contaminants from a contaminated feedstock includes combining a contaminated feedstock and supercritical water to form a supercritical water and feedstock solution in a hydrothermal separation vessel wherein the hydrothermal separation vessel includes an upper, separation zone, a bottom, concentration zone, and a mid-level, mixing zone located between the upper zone and the bottom zone. The process further includes maintaining a temperature and pressure within the hydrothermal separation vessel to achieve a vertical density gradient therein such that the upper zone of the separation vessel exhibits a lower density than the bottom zone of the separation vessel to cause the contaminants to separate from the solution in the separation zone and to form a product stream, removing the product stream from the upper, separation zone of the hydrothermal separation vessel, and removing the contaminants from the bottom, concentration zone of the hydrothermal separation vessel.

The present invention also includes a system for separating contaminants from a contaminated feedstock including a feedstock source for supplying a contaminated feedstock, a water source for supplying water, a heating device for heating the water to supercritical water conditions, and a hydrothermal separation vessel including at least one inlet for receiving the feedstock and the supercritical water. The hydrothermal separation vessel includes an upper, separation zone, a bottom zone comprising a concentration zone, and a mid-level mixing zone located between the upper zone and the bottom zone. The system further includes a mixing device for combining the contaminated feedstock and the supercritical water to form a solution, wherein the mixing device is positioned inline prior to at least one inlet of the hydrothermal separation vessel or positioned within the hydrothermal separation vessel itself. The hydrothermal separation vessel, feedstock, and supercritical water cooperate together to achieve a vertical density gradient within the hydrothermal separation vessel, wherein the upper, separation zone of the separation vessel exhibits a lower density than the bottom, concentration zone of the separation vessel to cause the polar and asphaltic contaminants to separate from the desirable organic solution in the separation zone and to form a product stream. The system also includes at least one outlet for removing the product stream from the upper, separation zone of the hydrothermal separation vessel and at least one outlet for removing the contaminants from the bottom, concentration zone of the hydrothermal separation vessel.

The present invention is a continuous process and system for the removal of metals, minerals, asphaltenes, and resins from a contaminated feedstock. Contaminated feedstock (which may or may not be referred to herein as organic) is defined here as any petroleum crude oil, crude oil fraction, refinery intermediate stream, contaminated hydrocarbon, or contaminated renewable oil including algal oils, pyrolysis oils, or waste oils and greases. The present invention takes advantage of the physical and chemical properties of supercritical water (SCW), defined as water above 374° C. and 22.1 MPa to effect the desired separation of contaminants from organic materials. At a temperature and pressure above the critical point of water (374° C., 22.1 MPa), the desirable nonpolar organic compounds become miscible in SCW and the undesirable polar compounds, asphaltenes, and resins become immiscible. Under proper conditions, immiscible components and solids will settle via gravity out of the SCW and oil solution. An important property of supercritical water is the rapid decrease in the density of SCW with temperature near the critical point of water. This relationship is shown in Table 1 for the temperature range of interest.

TABLE 1

Density of Supercritical Water at 3400 psia (23.44 MPa).

| Temperature, ° C. | Density, Kg/m³ |
|---|---|
| 374 | 299 |
| 380 | 236 |
| 390 | 165 |
| 400 | 140 |
| 410 | 126 |

The temperature-density relationship is an important feature of the present invention for several reasons that include, but are not limited to the following: 1) as SCW density decreases, the ratio of the density of the immiscible constituents to the density of SCW increases which, in turn, increases the settling rate of the immiscible constituents and thus allows for a faster separation rate between the desirable organic compounds and undesirable polar compounds, asphaltenes, and resins, 2) creation of a vertical density gradient, wherein the highest density is in the bottom, concentration zone and the lowest density is in the upper zone of the separation vessel, creates an inherently stable system which prevents convective mixing caused by a density inversion (higher density on the top than on the bottom), 3) the vertical density gradient permits continuous up-flow operation wherein SCW-soluble constituents are continuously removed with the SCW from the upper zone of the separation vessel and immiscible constituents are continuously removed from the bottom zone of the separation vessel, and 4) the inherently stable nature of the separation vessel, established by the vertical density gradient that prevents convective mixing, enables scale up to larger-diameter, higher-volume, commercial-scale systems.

Another feature of the present invention is that the separation vessel provides an operating environment in which the miscible hydrocarbon components are not reactive. Good separation performance is achieved at operating temperatures only slightly above the critical point of water, i.e., above 374° C., such as in the range of 374 to 400° C. At temperatures below 400° C., most crude oils and related petroleum fractions, such as ATB and VTB, are not reactive, even as neat, undiluted materials. When these organic materials are highly dispersed in low-density SCW, the potential for undesirable polymerization-type reactions is reduced further. In addition, asphaltene compounds that concentrate and are removed from the bottom, concentration zone of the separation vessel are stable since the temperature in the bottom zone of the separation vessel is near the critical point of water. At this temperature, the bottoms product remains flowable and can be continually removed from the bottom zone of the separation vessel.

This invention has numerous advantages over other cleanup processes such as solvent deasphalting. Advantages include, but are not limited to: 1) higher yields of VGO equivalent or DAO equivalent product from ATB and VTB; 2) lower yields of asphaltic bottoms material; 3) improved quality of VGO/DAO (lower metals, CCR, sulfur, and asphaltene content) at equivalent yields; 4) the ability to process oil-water emulsions and co-produce water that is low in total dissolved solids; 5) the replacement of volatile solvents and solvent recovery systems with water and oil-water separators; and 6) lower energy requirement than solvent-based systems where volatile solvents must be vaporized, compressed, and condensed in order to be reused. The process and system of the invention results in a high yield of product with significantly reduced concentrations of asphaltenes, resins, organic sulfur, metals, catalysts fines, and minerals, such as silicas, oxides, carbonates, sulfates, and phosphates. The system is specifically desirable for use in processing bitumen, petroleum crude oils, or petroleum fractions such as ATB, VTB, slurry oil from fluid catalytic crackers, and renewable fats, oils, and greases.

The present invention also has advantages over vacuum distillation because selective separation of contaminants is not a function of relative volatility or atmospheric equivalent boiling point, but is based on polarity, solubility in SCW, and density. Therefore, asphaltenes, metals, and heteroatoms can be selectively removed, which results in both higher yields of DAO equivalent oil and higher quality, i.e., lower levels of contamination. In addition, selectivity can be modified by changing separation temperature, the ratio of SCW to contaminated organic feedstock, or by the addition of separation aids. Separation aids may be organic or inorganic in nature and change selectivity based on polarity or chemical composition as opposed to relative volatility.

The SCW and oil fraction are cooled, expanded, and separated in a conventional oil-water separator or may be directly fed into a hydrothermal cracking process. The clean oil fraction may be further processed via conventional catalytic cracking processes such as FCC or hydrocracking. Water recovered from the separator is essentially similar to distilled water and may be recycled without further treatment. The contaminant fraction is concentrated in asphaltenes and other polar and non-soluble contaminants. This fraction may be used without additional treating as an asphalt blending component, or it may be converted to coke and light hydrocarbons via conventional coking processes.

DESCRIPTION OF THE INVENTION

As used herein, unless otherwise expressly specified, all numbers, such as those expressing values, ranges, amounts, or percentages may be read as if prefaced by the word "about", even if the term does not expressly appear. Any numerical range recited herein is intended to include all sub-ranges subsumed therein. Plural encompasses singular and vice versa. When ranges are given, any endpoints of those ranges and/or numbers within those ranges can be combined with the scope of the present invention. "Including", "such as", "for example", and like terms mean "including/such as/for example but not limited to".

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting. Like reference numerals refer to like elements.

It should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all sub-ranges beginning with a minimum value equal to or greater than 1 and ending with a maximum value equal to or less than 10, and all sub-ranges in between, e.g., 1 to 6.3, or 5.5 to 10, or 2.7 to 6.1.

In one embodiment, the present invention includes a process for separating contaminants in petroleum or other hydrocarbon feedstocks comprising: combining a contaminated organic feedstock with SCW to form a contaminated feedstock and SCW solution; subjecting the solution to SCW conditions in a hydrothermal separation vessel without conversion via thermal degradation or cracking reactions of the feedstock; maintaining a vertical density gradient in the separator; maintaining laminar, up-flow conditions such that immiscible contaminants are separated by gravity from the SCW and feedstock solution; continuously removing clean organic product and SCW from the upper, separation zone of the separation vessel; continuously removing immiscible contaminants from the bottom, concentration zone of the separation vessel; and cooling and separating clean organic product from the processed SCW. The density gradient in the hydrothermal separation vessel may result in plug flow therein, thereby preventing back mixing or eddy currents. The resulting clean organic product stream has a lower concentration of organic and inorganic contaminants than the contaminated organic stream. The organic feedstock may be premixed with SCW before feeding to the separation vessel or each stream may be delivered separately to a mid-level mixing zone in the separation vessel. The separation vessel may include at least three functional zones: 1) an upper, separation zone, 2) a mid-level, mixing zone, and 3) a bottom, concentration zone. The temperature in the concentration zone is maintained below a reaction temperature of the contaminants and above a pour point temperature of the contaminants. The separation process does not cause molecular rearrangement of hydrocarbon structures such as that which occurs during thermal cracking, fluid catalytic cracking, hydrocracking, isomerization, cyclization, hydrogenation, or dehydrogenation reactions. These conversion processes may be performed downstream of the system of the present invention, thereby benefitting from conversion of clean feedstock and reducing or eliminating the problems associated with conversion of contaminated feed stocks.

The separation process is accomplished by creating and maintaining a density gradient in the SCW separation vessel. The density gradient results in lower density material present in the upper, separation zone of the separation vessel and higher density material present in the bottom, concentration zone of the separation vessel. The density gradient is maintained directly or indirectly by a combination of organic feed properties and SCW properties in the separation vessel. Separation of miscible components from immiscible components occurs in the upper, separation zone, which is maintained above the critical point of water, 22.1 MPa and 374° C. Concentration of the immiscible components occurs in the bottom, concentration zone in or near the bottom of the separation vessel, which may or may not be maintained at SCW conditions. The mid-level, mixing zone exists in the separation vessel at a location that is below the upper, separation zone and above the bottom, concentration zone. The mixing zone is maintained above the critical point of water (374° C., 22.1 MPa).

Operating parameters of the separation vessel are controlled in a manner necessary to achieve the desired separation. These parameters include: 1) the ratio of water-to-oil, 2) the average vertical velocity or hydraulic residence time, 3) the temperature of the separation zone, 4) the pressure in the separation vessel, and 5) the nature of separation aids. System pressure affects the density of the process fluid that, in turn, affects the hydraulic residence time and contaminant settling rate. The separation can be performed at any pressure above the pressure of SCW (22.1 MPa). However, generally there is no practical benefit to operating at pressures greater than 27 MPa. It can be appreciated that specific operating conditions that are necessary to achieve optimal separation for a given contaminated organic material are dependent on its properties such as: 1) American Petroleum Institute (API) gravity, 2) chemical nature (paraffinic, naphthenic, or aromatic character), 3) asphaltene content, 4) resin content, and 5) fraction that has an atmospheric equivalent boiling temperature above 1000° F. (538° C.). The resins referred to above are typically high molecular weight compounds that act as a surfactant (with a polar and a non-polar end) that usually associate themselves with asphaltenes and keep the asphaltenes in solution in crude oil.

Optimal supercritical water-to-oil ratio depends on the level of contamination and the nature of the contaminated organic material. For instance, it can be appreciated that a higher water ratio may be required for deasphalting oil containing 10% heptane insoluble compounds (asphaltenes) than for oil containing only 1.0% heptane insoluble compounds. The typical range of SCW-to-oil ratio is between 1:10 to 3:1. Effective separation of asphaltenes is achieved at SCW-to-oil ratios between 1:5 and 1:1.

The net average vertical velocity in the separation vessel must be less than the gravity settling rate of the contaminants of interest. The vertical velocity is determined by the diameter of the separation vessel, the feed rate of SCW and contaminated organic feed streams, and the operating temperature and pressure. Vertical velocities range between 0.1 and 10 feet per minute (0.03 and 3 meters per minute). It can be appreciated that different contaminants exhibit different settling rates at a given set of operating conditions. However, for a given separation vessel, set of operating conditions, and specific contaminated organic feedstock, the actual settling rate can be determined empirically for each of the contaminants of interest. Vertical velocities between 0.5 and 6.5 feet per minute (0.15 and 2.0 meters per minute) provide effective separation for most contaminants of interest. The hydraulic residence time is a function of the vertical velocity and the height of the separation vessel. Increasing hydraulic residence time at a given vertical velocity increases time for contaminant separation in the separation vessel.

Temperature of the separation vessel is maintained by controlling the temperature, flow rate, and location of introduction of the contaminated feedstock and SCW control streams into the separation vessel. Direct contact of the contaminated feedstock and SCW control streams is one method for controlling temperature. The temperature also can be controlled by indirect means such as heat exchangers or external heating methods applied to the separation vessel. However, indirect heating can be less efficient due to insufficient heat transfer properties exhibited by SCW that is not mixed or in turbulent flow. The temperature and other conditions necessary to maintain the density gradient and to prevent convective mixing is dependent on the size of the separation vessel and the properties of the contaminated feed. A temperature gradient may be used to create a density gradient for some applications. The temperature gradient is achieved via establishing a difference between the temperature at the top of the upper, separation zone and the temperature of the mid-level, mixing zone. The minimum temperature of the mid-level, mixing zone is the critical temperature of water, 374° C. However, the transition from sub critical water to SCW actually occurs over a range of temperatures from several degrees above to several degrees below the critical point of water. Product temperatures that are significantly higher than 400° C. may lead to thermal cracking of the clean organic product depending on the thermal stability of the product. The temperature in the separation zone thus may be in the range of 380° C. to 450° C., but at most up to the highest temperature that can be achieved without causing thermal cracking, coking, or reaction of the feedstock.

Contaminated organic feedstock may be any petroleum crude oil, crude oil fraction, refinery intermediate stream, contaminated hydrocarbon, or contaminated renewable oil. Refinery intermediate streams may include atmospheric tower bottoms (ATB), vacuum tower bottoms (VTB), and/or fluid catalytic cracker (FCC) slurry oil bottoms. Other hydrocarbon streams may include bitumen, tar sands, shale oil, coal liquids, used motor oil, or mixtures thereof. Renewable feed streams may include lipids; waste fats, oils, and greases; soaps; algae and/or algal oil; and pyrolysis oil. It can be appreciated that other types of contaminated feedstock may be separated by the process and system of the present invention.

Contaminants that are removed include inorganic materials, such as halides (e.g., Cl, Br, I), phosphorus and phosphorus-containing species, alkali metals and metalloids (e.g., B, Na, K, Si), and other metals (e.g., Ca, Fe, Mg, Ni, V, Zn). Organic contaminants that are removed include asphaltenes, resins (e.g. high molecular weight compounds that act as a surfactant with a polar and non-polar end that usually associated themselves with asphaltenes and are credited with keeping asphaltenes in solution in crude oil), polymers, high molecular weight polycyclic aromatic hydrocarbons (PAHs), and coke precursors. It can be appreciated that it may be desirable to recover the resins with the product or to dispose of the resins, along with the asphaltene fraction. It can also be appreciated that the resins discussed above do not include C5 and C9 resins, which are commercially produced for a variety of applications. Organic heteromolecules that are partially removed include organically-bound sulfur, nitrogen, and oxygen compounds. The degree of heteromolecule reduction is dependent on the chemical and physical properties of the contaminated organic feed and the molecular weight and polarity of the heteromolecule. Particulate matter that is removed includes coke, mineral and mineral particulates, salts, catalyst fines, cellulose, and lignocellulose.

Concentrated contaminants are removed from the bottom of the separation vessel. Depending on the quality of hydrocarbon feed, the yield of the concentrated contaminant stream may be limited to less than 5 wt. % to 10 wt. %. Concentrated contaminant stream properties may be controlled by increasing or decreasing contaminant stream yield relative to product yield to permit direct use of the contaminant stream as an asphalt blend stock, or the contaminant stream could be converted to coke and low-molecular-weight hydrocarbons via commercial coking processes.

The clean organic product exiting the separation vessel has sufficiently low metals and asphaltenes content to permit conversion into distillate fuels via catalytic hydrotreating, hydrocracking, hydrothermal cracking, or fluid catalytic cracking. The contaminants may be reduced to less than 0.05 wt. % asphaltene, less than 0.05 wt. % ash, and less than 20 ppm metals total, i.e., over 99% reduction of contaminants such as asphaltenes and particulate matter. The yield of clean organic product may be greater than 90% or even 95% depending on the quality of contaminated organic feed. Separation aids may be used to selectively enhance the separation and recovery of high molecular weight, non-paraffinic hydrocarbons by increasing solubility in supercritical water. Separation aids may also be used to selectively enhance the removal of polar contaminants. Separation aids may be introduced via the contaminated organic feed, the SCW feed, or as a separate feed stream. A particular separation aid can be selected based on the chemical make-up of the feedstock being used and is selected to chemically react with the feedstock being dissolved in the supercritical water so as to create a more favorable environment for dissolving "like" molecules that have a high molecular weight and may not otherwise be soluble in supercritical water. For example, the use of xylene as a separation aid could "extract" more high molecular weight aromatic compounds in the SCW phase. Even though asphaltenes are soluble in xylene, xylene will not improve the solubility of asphaltenes in SCW. Other examples of separation aids are cycloparaffin compounds, when used with highly naphthenic crude oils, or compounds like tetralin that have both aromatic and napthenic character. The separation aids should have a low boiling point relative to the ATB or VTB contaminated oil and can be easily recovered and reused. Also, separation aids can be used to decrease the SCW solubility of some constituents in the contaminated oil by the creation of a higher molecular weight or more polar complexes that would not be soluble in SCW. Examples include compounds that can complex with resins, or sulfur compounds. These types of separation aids can be organic, inorganic, materials such as salt compounds, or weak acids and may be useful when treating renewable oils or waste soaps. Process water recovered with the clean organic product is essentially similar to distilled water and may be reused without further treatment. It can be appreciated that either the clean hydrocarbon and SCW stream or the concentrated contaminant stream from the SCW separation system may be directly coupled to any downstream conversion system to minimize energy requirements by eliminating additional cooling, heating, and pumping operations.

Figure 1:
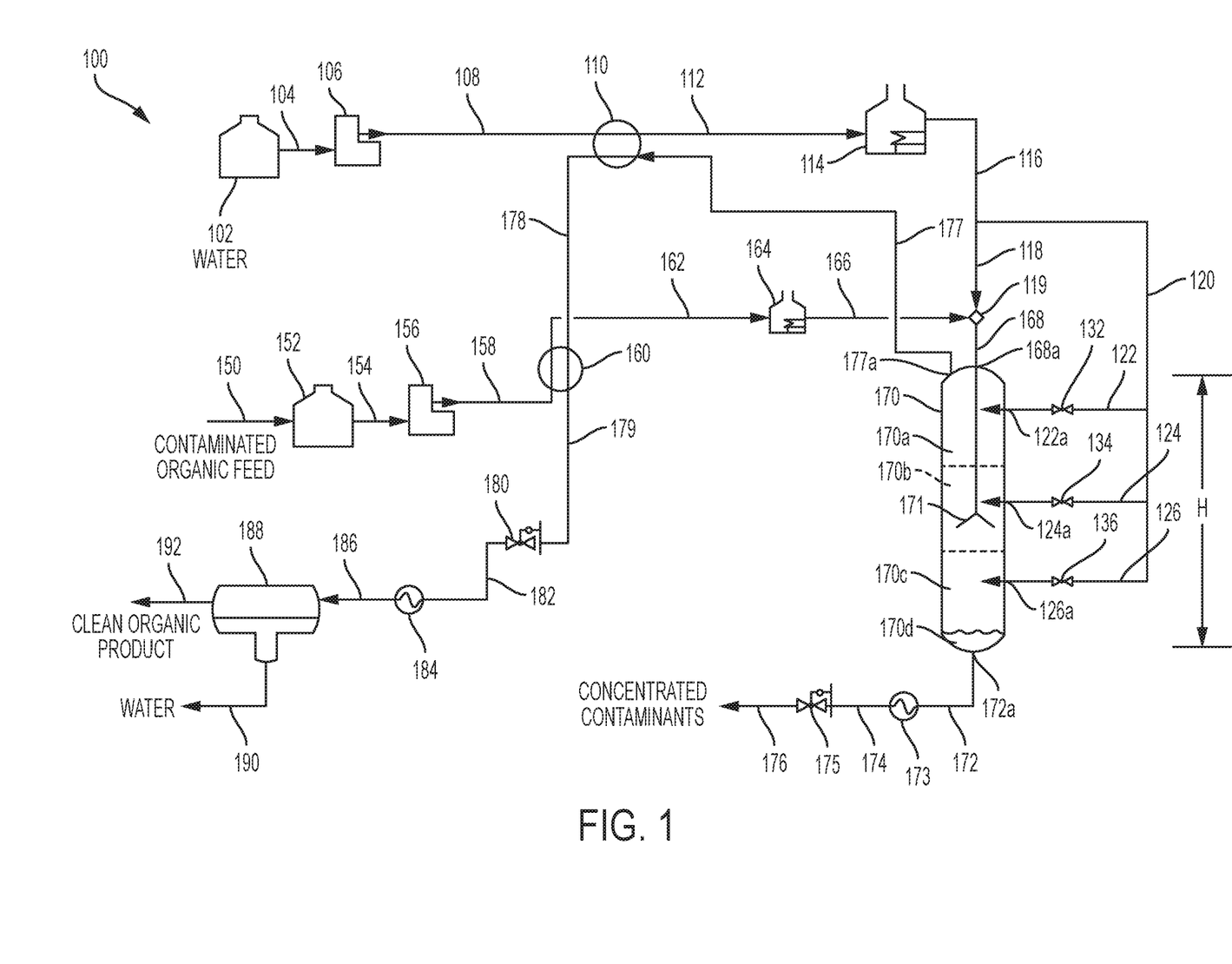
FIG. 1 is a schematic view of an SCW separation system in accordance with the present invention used for the cleanup of hydrocarbons, where SCW is pre-mixed with the contaminated organic feed stream prior to entering a separation vessel in a continuous process.

Reference is now made to FIG. 1, which shows a schematic view of the system, generally indicated as 100, in accordance with the invention for the cleanup of hydrocarbons where supercritical water is pre-mixed with the contaminated organic feed stream in a continuous process. The process and system of the present invention includes providing a hydrocarbon or petroleum-based contaminated feedstock 150. The contaminated feedstock 150 may be fed into an equalization tank 152. Generally, an equalization tank acts as a holding tank that allows for equalization of the flow of the feedstock. An equalization tank can also act as a conditioning operation where the temperature of the feedstock is controlled to maintain desired flow characteristics. The contaminated feedstock exits the equalization tank 152 at a location 154 and enters into a pump 156 to form a pressurized feed stream 158. The pressurized feed stream 158 may be partially and indirectly heated by a feed-effluent heat exchanger 160 to form a partially heated organic stream 162. It can be appreciated that the feed-effluent heat exchanger 160 can be any combination of heat exchangers configured throughout the process to maximize overall thermal efficiency. The partially heated organic stream 162 may be heated further to the desired process temperature by any heating device, such as a furnace 164, to form a heated feed stream 166.

A water feed stream 104 can be supplied from an equalization tank 102 and fed to a pump 106 to form a pressurized water stream 108 (above critical pressure of water). The pressurized water stream 108 may be partially heated by a feed-effluent heat exchanger 110 to form a partially heated water feed 112. Water feed 112 can be heated to the desired process temperature by any heating device, such as a furnace 114, to form a SCW stream 116. Part of the SCW stream 116 is diverted to a stream 120. Stream 120 may be further split into one or more control streams such as 122, 124, and 126. Control valves 132, 134, and 136 control the flow of streams 122, 124, and 126 through inlets 122a, 124a, and 126a into a hydrothermal separation vessel 170 located along different vertical heights H of the hydrothermal separation vessel 170. The hydrothermal separation vessel includes an upper, separation zone 170a, a mid-level, mixing zone 170b, and a bottom portion 170c comprising a concentration zone 170d. The mixing zone 170b is located between the upper zone 170a and the bottom zone 170c/concentration zone 170d.

The flow of each stream is controlled in a manner that maintains the desired temperature and density gradient in the hydrothermal separation vessel 170. It can be appreciated that stream 120 may be fed directly to vessel 170 or may be split into any number of control streams necessary to maintain desired operating conditions. By way of example, control streams 122, 124, and 126 are either directly injected into the separation vessel 170 thereby controlling the temperature in the separation vessel 170 or may be used to indirectly control temperature by means such as heat exchangers or heat jackets (not shown).

The remainder of SCW stream 116, stream 118, is pre-mixed with contaminated hydrocarbon feed stream 166 to form a solution stream 168 of SCW and hydrocarbon before being fed via at least one inlet 168a into the separation vessel 170. It can be appreciated that the SCW stream 118 and contaminated hydrocarbon feed stream 166 are essentially miscible and may be mixed by any conventional means at 119 by mixing valves, static mixers, or simple tee connections to form solution stream 168. It can also be appreciated that SCW stream 116 can be heated to temperatures higher than the operating temperature of separation vessel 170 to provide additional heat to the contaminated hydrocarbon feed stream 166 and the separation vessel 170. Operation in this manner reduces the temperature of heated hydrocarbon stream 166 and minimizes the potential for thermal degradation of hydrocarbon feed streams that are thermally unstable due to olefin content or contaminants present. Solution stream 168 may be introduced into the separation vessel 170 at any location that is necessary to achieve separation and settling of immiscible contaminants. The solution stream 168 may be distributed vertically or horizontally in separation vessel 170 by any distribution device 171, such as an eductor or manifold.

Separation vessel 170 provides for the upper, separation zone 170a to be above the distribution device 171 and the settling or concentration zone 170d below the point where solution stream 168 enters separation vessel 170 via the distribution device 171. The location of the distribution device 171 within separation vessel 170 may be adjusted in relation to the upper zone 170a, mid-level zone 170b, and bottom zone 170c/concentration zone 170d of the separation vessel 170, location of control streams 122, 124, 126, as needed based on the feedstock composition, water to organic ratio, vertical flow velocity, temperature, and pressure. The dimensions of separation vessel 170 and the combined feed rates of streams 168 and 120 (if used for direct heating) are controlled to result in a vertical velocity that is less than the gravity settling rate of the immiscible organic and inorganic contaminants of interest at specific operating conditions. The upper, separation zone 170a is maintained above the critical point of water and exhibits a vertical density gradient where the density is lower at the top of the vessel and higher toward the bottom of the vessel. The upper, separation zone 170a of separation vessel 170 is maintained below the temperature that would cause thermal degradation of the hydrocarbon stream dissolved in SCW. A product stream 177, from which the contaminants have been separated, is continually removed from at least one outlet 177a at the top of separation vessel 170. Product stream 177 is a solution of SCW and clean miscible hydrocarbons.

Immiscible contaminants separate from the clean hydrocarbon and SCW solution and concentrate in the bottom, concentration zone 170d of separation vessel 170. As contaminants settle and concentrate, they are continually removed from the concentration zone 170d as a contaminant stream 172 via at least one outlet 172a. Contaminant stream 172 may consist of asphaltenes, sulfur and nitrogen-containing heteromolecules, feed hydrocarbon, supercritical water, subcritical water, other immiscible contaminants, any combination of the above, and suspended particulate matter that may consist of catalyst fines, carbon, minerals, or salts. Contaminant stream 172 may be partially cooled by a heat exchanger 173, and is controlled at a temperature sufficient to maintain relatively low viscosity and good flow characteristics of a stream 174. The flow rate of stream 174 is controlled by a flow control device 175 in a manner that maintains steady-state performance of separation vessel 170 and minimizes the loss of hydrocarbon feed in concentrated contaminants stream 176. It can be appreciated that flow control device 175 may be any type of device such as a backpressure regulator, flow control valve, or block-valve system.

Product stream 177 is fed to feed-effluent heat exchanger 110 and forms partially cooled stream 178. Stream 178 is fed to feed-effluent heat exchanger 160 and is cooled further to form a stream 179. Stream 179 passes through a pressure control device 180 to form a low-pressure product stream 182. It can be appreciated that pressure control device 180 may be any type of device such as a backpressure regulator, flow control valve, orifice, or capillary system. Low-pressure product stream may be cooled further by a low-pressure heat exchanger 184 to achieve the desired temperature of a product stream 186 for oil-water separation. The cooled product stream 186 is fed to an oil-water separator 188 to be separated into streams of a clean organic product 192 and a water product 190. Rapid and complete separation of the oil and water phases occurs in oil-water separator 188 because polar constituents in the contaminated organic feed 150, which could lead to the formation of emulsions, have been removed from the clean organic product 192. Polar, water-soluble impurities have also been removed from the product water stream 190 resulting in very low total dissolved solids and the ability to reuse recovered water without further treatment.

Figure 2:
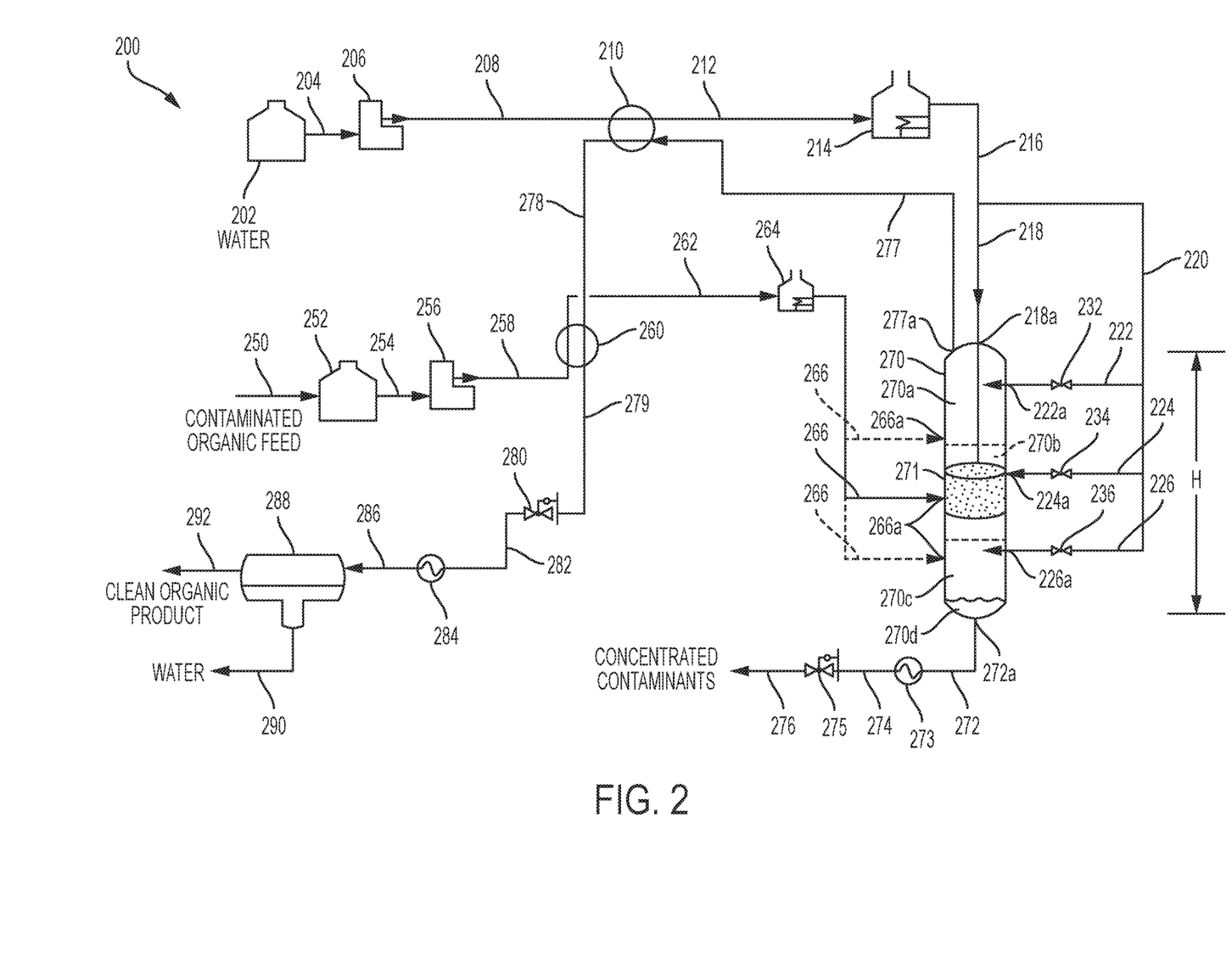
FIG. 2 is a schematic view of the SCW separation system in accordance with the present invention used for the cleanup of hydrocarbons, where the SCW and contaminated organic feed streams are mixed in the mixing zone of a supercritical water separation vessel in a continuous process.

Reference is now made to FIG. 2, which is a schematic view of a supercritical water separation system 200 in accordance with the invention for the cleanup of hydrocarbons where the SCW and contaminated hydrocarbon feed streams are mixed in the mixing zone of a SCW separation vessel in a continuous process. This system is similar to the embodiment shown in FIG. 1, but mixing the SCW with the contaminated hydrocarbon stream is accomplished internally within the separation vessel 270 versus externally as accomplished by mixing device 119. The system 200 includes a feed system as shown in FIG. 2 for providing a contaminated organic feedstock 250, fed into an equalization tank 252, then fed via a stream 254 to a high-pressure pump 256 to form a pressurized organic stream 258. Stream 258 is then partially heated by a feed-effluent heat exchanger 260 and then stream 262 is heated to the desired process temperature by a heating device 264, which can be any heating device, such as a fired furnace, to form a heated hydrocarbon feed stream 266.

In a like manner, the water feed for system 200 is analogous to the water feed for system 100. Water 204 from an equalization tank 202 is fed to a pump 206 to form a pressurized water stream 208. Water stream 208 is feed to a feed-effluent heat exchanger 210 to form a partially heated water stream 212. Water stream 212 is heated to a desired process temperature by any heating device, such as a furnace 214, to form an SCW steam 216. It can be appreciated that SCW stream 216 can be heated to temperatures higher than the operating temperature of a separation vessel 270 to provide additional heat to hydrocarbon feed stream 266 and the separation vessel 270.

A portion of the SCW stream 216 is diverted to a stream 220. Stream 220 may be further split into one or more control streams such as 222, 224, and 226. Control valves 232, 234, and 236 control the flow of streams 222, 224, and 226 through inlets 222a, 224a, and 226a to vessel 270. A remainder of the SCW stream 218 can be fed into vessel 270 via at least one inlet 218a. The flow of each stream is controlled in a manner that maintains the desired temperature in separation vessel 270. It can be appreciated that stream 220 may be split into any number of control streams necessary to maintain desired operating conditions. Control streams 222, 224, and 226 are used to control the temperature in vessel 270 by either direct injection into vessel 270 or by indirect means such as heat exchangers or heat jackets.

In system 200, SCW and contaminated hydrocarbon streams are not premixed before entering separation vessel as was shown for system 100. In system 200, mixing takes place in a mixing zone 271 internal to separation vessel 270. It can be appreciated that SCW streams 218, 222, 224, and 226, and indirectly heated hydrocarbon feed stream 266 are essentially miscible and may be mixed by any conventional means in the mixing zone 271. Mixing of streams 218, 222, 224, and 226 with feed stream 266 may further directly heat the contaminated feedstock. As with location of distribution device 171 in system 100, it can also be appreciated that the heated hydrocarbon feed stream 266 may be introduced into hydrothermal separation vessel 270 at any location (e.g., at 266a) and that the specific location of mixing zone 271 in vessel 270 can by adjusted to accommodate different contaminated feedstocks and operating parameters. The hydrothermal separation vessel 270 comprises an upper, separation zone 270a and 270b, and a bottom, concentration zone 270c, including a contaminant or settling zone 270d. The mixing zone 271 may include distribution manifolds or other mechanical devices and/or shear or turbulent mixing induced by SCW and hydrocarbon feed stream contact. Benefits of in-situ mixing may include: 1) reduced mixing temperature of the contaminated organic feed and SCW, 2) reduced preheat requirements for the contaminated organic feed, 3) reduced likelihood that the less-stable constituents of the contaminated hydrocarbon feed will undergo thermal degradation before contacting supercritical water, 4) reduced likelihood that insoluble constituents of the contaminated organic feed will prematurely precipitate from solution and foul feed or transfer lines, 5) creation of a larger mixing zone with improved mixing that is especially beneficial when scaling up to larger systems, and 6) the ability to change the physical parameters of the mixing zone to improve performance based on the properties of the contaminated organic feedstock.

Products from system 200 are recovered in the same manner as was accomplished in system 100. Contaminant stream 272 exits the separation vessel 270 via an outlet 272a and is partially cooled by a heat exchanger 273, but controlled at a temperature sufficient to maintain relatively low viscosity and good flow characteristics of a stream 274. The flow rate of stream 274 is controlled by a flow control device 275 in a manner that maintains steady-state performance of separation vessel 270 and minimizes the loss of hydrocarbon feed. Properties of a concentrated contaminant stream 276 may be controlled to permit direct use as an asphalt blend stock or may be converted to coke and low-molecular-weight hydrocarbons (not shown) via commercial coking processes.

Product stream 277, from which the contaminants have been removed, exits the separation vessel 270 via one or more outlets 277a and is fed to feed-effluent heat exchanger 210 to form a partially cooled stream 278. Stream 278 is fed to feed-effluent heat exchanger 260 and is cooled further to form a stream 279. Stream 279 passes through a pressure control device 280 to form a low-pressure product stream 282. Low-pressure product stream 282 may be cooled further by a low-pressure heat exchanger 284 to achieve the desired temperature of a product stream 286 for oil-water separation. The cooled product stream 286 is fed to an oil-water separator 288 to be separated into streams of a clean organic product 292 and a clean water product 290.

The following examples are presented to demonstrate the principles of the present invention. The invention should not be considered as limited to the specific examples presented.

EXAMPLES

Example 1

Atmospheric Tower Bottoms (ATB) Separation

A bench-scale separation system was configured as shown in FIG. 1. In this configuration, SCW 118 and contaminated oil 166 were mixed at tee connection 119 immediately before being fed into the separation vessel 170. A control stream of SCW 126 was also fed at location 126a into separation vessel 170 just below the mixing zone. The inside diameter of the bench-scale separation vessel was 2.8 cm (1.1 inches) and the height of the vessel was 1.65 meters (65 inches). The contaminated organic feed oil was an atmospheric tower bottoms (ATB) from a refinery in the intermountain west. This particular ATB had been previously treated in a ROSE solvent deasphalting system so it exhibited relatively low asphaltene content. However, this ATB did contain metals, sulfur, and had a relatively high Conradson Carbon Residue (CCR).

The bench-scale separation system was operated with continuous flow of ATB, mix water, control water. Overhead product water and clean oil 177 were continuously removed at location 177a. The concentrated contaminants 172 were continually removed from the bottom of the separation vessel at location 172a. After cooling and expansion of product stream 186 across pressure control valve 180, it was separated by gravity in oil-water separator 188 and product 192 was recovered for analysis. The basic operating parameters are summarized in Table 2.

TABLE 2

Operating Parameters

| Parameter | Value |
|---|---|
| Oil feed (166) rate, ml/min | 38 |
| Mix water (118) rate, ml/min | 35 |
| Control water (126) rate, ml/min | 25 |
| Total water feed rate, ml/min | 60 |
| Water-to-oil ratio, volume basis | 1.58 |
| Vessel operating pressure, psig/MPa | 3330/22.96 |
| Mixing zone temperature, ° C. | 404 |
| SCW density in the mix zone, kg/m$^3$ | 128 |
| Vertical velocity at operating Temperature & Pressure, m/min | 1.07 |

Product oil 192 and water 190 phases separated rapidly and completely with no "rag" layer formation. Feed and product properties are summarized in Table 3. A significant improvement in the product properties was obtained. API gravity of the contaminated ATB was increased by 4.6 degrees. Viscosity was reduced from 144 cSt at 60° C. to 28 cSt at 50° C. Sulfur was reduced by 37%. CCR and ash content were reduced to near zero. Metals content was reduced to 0.1 ppm or less for each metal tested with the exception of nickel and vanadium, which was reduced by 90% to 0.5 ppm. The supercritical water separation process showed a significant improvement in the quality of ATB that had been previously deasphalted by the ROSE process.

TABLE 3

ATB Contaminated Feed and Clean Product Properties

| Property | ATB Feed | Product |
|---|---|---|
| Specific Gravity, g/cc | 0.885 | 0.860 |
| API, degrees | 28.4 | 33.0 |
| Viscosity, cSt @60 C. | 144 | |
| Viscosity, cSt @50 C. | | 28 |
| Heptane Insolubles, wt % | 0.042 | 0.032 |
| Conradson Carbon Residue, wt % | 2.42 | 0.11 |
| Sulfur, mg/kg | 676 | 426 |
| Ash, wt % | 0.019 | <0.001 |
| Metals, mg/kg | | |
| Ca | 1.4 | <0.1 |
| Mg | 0.4 | 0.1 |
| Na | 7.1 | <0.1 |
| K | 0.1 | 0.1 |
| Fe | 12.8 | <0.1 |
| Ni | 1.8 | 1.3 |
| V | 4.9 | 0.5 |

Example 2

Canadian Bitumen Separation

A bench-scale separation system was configured as shown in FIG. 1. In this configuration, SCW 118 contaminated organic feed oil 166 and control SCW 126 were delivered to the separation vessel in the same manner as Example 1. The contaminated organic feed oil was Canadian bitumen that was produced by the SAGD process (Steam-Assisted, Gravity Drain). In the SAGD process, steam is pumped into the bitumen-containing geologic formation and a hot slurry of water and bitumen is recovered. Water had been previously removed from this sample of bitumen. However, the supercritical water separation system is capable of processing the bitumen and water slurry without the need to separate the water. The density and viscosity of most Canadian bitumens are too high to permit transporting by pipeline without extensive upgrading. The purpose of this example was to demonstrate that the present invention can reduce the density and viscosity of the bitumen to meet pipeline requirements.

The bench-scale separation system was operated with continuous flow of neat bitumen, mix water, control water. The bitumen was heated to at least 80° C. to lower its viscosity and permit effective pumping. Overhead product water and clean oil were continuously removed in the same manner as Example 1 and the organic product was recovered for analysis. The basic operating parameters for the Canadian bitumen separation are summarized in Table 4.

TABLE 4

Operating Parameters for Canadian Bitumen Separation

| Parameter | Value |
|---|---|
| Oil feed (166) rate, ml/min | 84 |
| Mix water (118) rate, ml/min | 20 |
| Control water (126) rate, ml/min | 20 |
| Total water feed rate, ml/min | 40 |
| Water-to-oil ratio, volume basis | 0.48 |
| Vessel operating pressure, psig/MPa | 3375/23.27 |
| Mixing zone temperature, ° C. | 400 |
| SCW density in the mix zone, kg/m$^3$ | 138 |
| Vertical velocity at operating Temperature & Pressure, m/min | 1.20 |

Product oil and water phases separated rapidly and completely with no "rag" layer formation. The bitumen feed and product properties are summarized in Table 5. A significant improvement in the product properties was obtained. API gravity of the contaminated bitumen feed was increase from 8.6 to 21.9. Pipelines require the API gravity to be greater than 19.0. Viscosity was reduced from 2030 cSt at 60° C. to 18.8 cSt at 40° C. 18.8 cSt at 40° C. is equivalent to about 75 cSt at 15° C., which is well below typical the pipeline requirements of less than 350 cSt between 7.5 and 18.5° C. depending on the season. The asphaltene content, as measured by n-heptane insolubles, was dramatically reduced by 99.5%. The supercritical water separation process showed that low-asphaltene, pipeline-quality oil can be produced from Canadian bitumen by the present invention.

TABLE 5

Bitumen Feed and Clean Product Properties

| Property | Bitumen Feed | Product |
| --- | --- | --- |
| Specific Gravity, g/cc | 1.01 | 0.922 |
| API, degrees | 8.6 | 21.9 |
| Viscosity, cSt @60° C. (measured) | 2030 | |
| Viscosity, cSt @40° C. (measured) | | 18.8 |
| Viscosity, cSt @15° C. (derived) | | ~75 |
| Heptane Insolubles, wt % | 8.77 | 0.045 |

CLAUSES

The present invention is also directed to the following clauses:

Clause 1: A process for separating contaminants from a contaminated feedstock comprised of combining a contaminated feedstock and supercritical water to form a supercritical water and feedstock solution in a hydrothermal separation vessel, said hydrothermal separation vessel including an upper separation zone and a bottom concentration zone; maintaining a temperature and pressure within the hydrothermal separation vessel to achieve a vertical density gradient therein such that the separation zone of the hydrothermal separation vessel exhibits a lower density than the concentration zone of the hydrothermal separation vessel, to cause the contaminants to separate from the solution in the separation zone and to form a product stream; removing the product stream from the separation zone of the hydrothermal separation vessel; and removing the contaminants from the concentration zone of the hydrothermal separation vessel.

Clause 2: The process of clause 2, wherein the separation zone is maintained at a pressure greater than 22.1 MPa and a temperature greater than 374° C.

Clause 3: The process of clause 1 or 2, wherein the hydrothermal separation vessel includes a mid-level, mixing zone located between the separation zone and the concentration zone, wherein the contaminated feedstock and the water are each separately fed into the mixing zone, and wherein sufficient shear and mixing is provided in the mixing zone to cause dissolution of any soluble components of the feedstock into the supercritical water and separation of the contaminants as insoluble components.

Clause 4: The process of any of clauses 1-3, wherein the contaminated feedstock and supercritical water are mixed together prior to delivery to the hydrothermal separation vessel.

Clause 5: The process of any of clauses 1-4, wherein the contaminated feedstock is preheated indirectly prior to mixing with the supercritical water or is heated directly by mixing with the supercritical water.

Clause 6: The process of any of clauses 1-5, wherein the separation zone of the hydrothermal separation vessel is configured to achieve up-flow of the supercritical water and any dissolved portions of the feedstock.

Clause 7: The process of any of clauses 1-6, wherein dimensions of the hydrothermal separation vessel and feed rates of the supercritical water and contaminated feedstock are controlled to result in a vertical velocity that is less than a gravity settling rate of the contaminants.

Clause 8: The process of clause 7, wherein the vertical velocity in the hydrothermal separation vessel is between 0.1 and 10 feet per minute.

Clause 9: The process of any of clauses 1-8, wherein the density gradient in the hydrothermal separation vessel results in plug flow in the vessel.

Clause 10: The process of any of clauses 1-9, wherein a temperature in the separation zone of the hydrothermal separation vessel is between 380° C. and 450° C., or up to the highest temperature that can be achieved without causing thermal cracking, coking, or reaction of the feedstock.

Clause 11: The process of clause 10, wherein the temperature in the separation zone of the hydrothermal separation vessel is maintained directly by introduction of supercritical water to the hydrothermal separation vessel or indirectly by internal or external heat exchangers or heaters applied to the hydrothermal separation vessel.

Clause 12: The process of any of clauses 1-11, wherein a temperature in the concentration zone is maintained below a reaction temperature of the contaminants and above a pour point temperature of the contaminants.

Clause 13: The process of any of clauses 1-12, wherein the product stream is continually removed from the hydrothermal separation vessel and the contaminants are continually removed from the concentration zone of the hydrothermal separation vessel.

Clause 14: The process of any of clauses 1-13, wherein a ratio of supercritical water-to-feedstock is between 1:10 to 3:1.

Clause 15: The process of any of clauses 1-14, wherein the contaminated feedstock comprises petroleum crude oils, bitumen, petroleum refinery streams, waste or reclaimed oils and/or crude oil storage tank residue; renewable oils; soaps, algae and/or algal oil, and pyrolysis oil; and the contaminants comprise coke or mineral particulates, asphaltenes, catalyst fines, resins, salts, metals, and/or minerals.

Clause 16: The process of any of clauses 1-15, wherein the temperature in the hydrothermal separation vessel is controlled by supplying split streams of supercritical water and/or split streams of heated contaminated feedstock at differing locations along a vertical height of the hydrothermal separation vessel between the separation zone and the concentration zone.

Clause 17: The process of any of clauses 1-16, including the addition of separation aids to selectively enhance the separation and recovery of high molecular weight, non-paraffinic hydrocarbons or to selectively enhance the separation and removal of polar contaminants.

Clause 18: A system for separating contaminants from a contaminated feedstock comprised of: a hydrothermal separation vessel including at least one inlet for receiving a feedstock and a supercritical water, said hydrothermal separation vessel including an upper separation zone, a bottom concentration zone, and a mid-level mixing zone located between the separation zone and the concentration zone; a mixing device for combining the contaminated feedstock and the supercritical water to form a solution, wherein said mixing device is positioned inline prior to the at least one inlet of the hydrothermal separation vessel or positioned within the hydrothermal separation vessel, wherein said hydrothermal separation vessel, feedstock, and supercritical water cooperate together to achieve a vertical density gradient within the hydrothermal separation vessel, wherein the separation zone of the hydrothermal separation vessel exhibits lower density than the concentration zone of the hydrothermal separation vessel to cause the contaminants to separate from the solution in the separation zone and to form a product stream; at least one outlet for removing the product stream from the separation zone of the hydrothermal separation vessel; and at least one outlet for removing the contaminants from the concentration zone of the hydrothermal separation vessel.

Clause 19: The system of clause 18 including multiple inlets within the hydrothermal separation vessel for receiving split streams of supercritical water and/or split streams of heated contaminated feedstock therein, wherein the multiple inlets are located at varying vertical heights between the separation zone and the concentration zone of the hydrothermal reactor to control the temperature of the hydrothermal separation vessel.

Clause 20: The system of clause 18 or 19, wherein the temperature in the separation zone of the hydrothermal separation vessel is between 380° C. and 450° C., or up to the highest temperature that can be achieved without causing thermal cracking, coking, or reaction of the feedstock, and the temperature in the concentration zone is maintained below a reaction temperature of the contaminants and above a pour point temperature of the contaminants.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of this description. For example, it is to be understood that the present invention contemplates that, to the extent possible, one or more features of any embodiment can be combined with one or more features of any other embodiment.

Whereas particular embodiments of this invention have been described above for purposes of illustration, it will be evident to those skilled in the art that numerous variations of the details of the present invention may be made without departing from the invention as defined in the appended claims.

The invention claimed is:

1. A system for treating a feedstock comprising:
a hydrothermal separation vessel including an upper separation zone, a mid-level mixing zone, and a bottom concentration zone, the mid-level mixing zone including a plurality of inlets for separately receiving a feedstock and supercritical water therein to form a mixture, the mid-level mixing zone configured to provide sufficient shear and mixing to cause dissolution of any soluble components of the feedstock into the supercritical water,
wherein a vertical density gradient is achieved within the hydrothermal separation vessel, such that the separation zone exhibits a lower density than the concentration zone to form a product stream; and
at least one outlet for removing the product stream from the separation zone.

2. The system of claim 1, wherein the mixing zone causes separation of any immiscible or insoluble components from the mixture and the system further includes at least one outlet for removing the immiscible or insoluble components from the concentration zone.

3. A system for treating a feedstock comprising:
a hydrothermal separation vessel including multiple inlets within the hydrothermal separation vessel for receiving split streams of supercritical water and/or split streams of heated feedstock therein to form a mixture, said hydrothermal separation vessel including an upper separation zone, an intermediate mixing zone, and a bottom concentration zone, wherein the multiple inlets are located at varying vertical heights between the separation zone and the concentration zone to achieve a vertical density gradient within the hydrothermal separation vessel, such that the separation zone exhibits lower density than the concentration zone and causes dissolution of any soluble components of the feedstock into the supercritical water; and
at least one outlet for removing the product stream from the separation zone.

4. The system of claim 3, wherein the mixing zone causes separation of any immiscible or insoluble components from the mixture and the system further includes at least one outlet for removing the immiscible or insoluble components from the concentration zone.

5. The system of claim 4, wherein the separation zone of the hydrothermal separation vessel is designed to operate between 380° C. and 450° C., or up to the highest temperature that does not cause reaction of the feedstock, and the concentration zone of the hydrothermal separation vessel is designed to maintain a temperature below the reaction temperature of the immiscible or insoluble components and above the pour point temperature of the immiscible or insoluble components.

6. The system of claim 3 including at least one mixing device for combining the feedstock and the supercritical water to form the solution, wherein said mixing device is positioned inline prior to the at least one inlet of the hydrothermal separation vessel and/or positioned within the hydrothermal separation vessel.

* * * * *